(12) United States Patent
Krueger et al.

(10) Patent No.: US 9,321,089 B2
(45) Date of Patent: Apr. 26, 2016

(54) METHOD AND APPARATUS FOR PRODUCTION OF HELICAL SPRINGS BY SPRING WINDING

(75) Inventors: Wolfgang Krueger, Trochtelfingen (DE); Stefan Blind, St. Johann (DE)

(73) Assignee: WAFIOS AG (DE)

( * ) Notice: Subject to any disclaimer, the term of this patent is extended or adjusted under 35 U.S.C. 154(b) by 676 days.

(21) Appl. No.: 12/901,613

(22) Filed: Oct. 11, 2010

(65) Prior Publication Data

US 2011/0214467 A1  Sep. 8, 2011

(30) Foreign Application Priority Data

Mar. 3, 2010 (DE) .......................... 10 2010 010 895

(51) Int. Cl.
*B21C 51/00* (2006.01)
*B21F 3/02* (2006.01)
*B21F 3/00* (2006.01)

(52) U.S. Cl.
CPC . *B21C 51/00* (2013.01); *B21F 3/02* (2013.01); *B21F 3/00* (2013.01)

(58) Field of Classification Search
CPC .............. B21F 3/00; B21F 3/02; B21F 3/04; B21D 5/04; B21D 3/10; B21D 3/16; H01R 43/033; B21C 51/00
USPC ................. 72/17.3–18.2, 135, 137, 142, 145; 29/33 F
See application file for complete search history.

(56) References Cited

U.S. PATENT DOCUMENTS 4,991,277 A * 2/1991 Itaya ........................... 140/71.5
5,875,664 A * 3/1999 Scott et al. ..................... 72/16.1
(Continued)

FOREIGN PATENT DOCUMENTS

DE      42 39 207 A1    5/1994
DE      195 14 486 A1   10/1996
(Continued)

OTHER PUBLICATIONS

Japanese Office Action issued Feb. 4, 2014 for the corresponding Japanese Application No. 2011-031741.

(Continued)

*Primary Examiner* — David Bryant
*Assistant Examiner* — Lawrence Averick
(74) *Attorney, Agent, or Firm* — DLA Piper LLP (US)

(57) ABSTRACT

A method of producing helical springs by spring winding with a numerically controlled spring winding machine includes feeding a wire, controlled by an NC control program, through a feed device to a forming device of the spring winding machine, forming a helical spring from the wire with the forming device, measuring an actual geometry of the helical spring to obtain actual spring data, comparing the actual spring data with nominal spring data to determine discrepancy data which represents a discrepancy between an actual geometry and a predetermined nominal geometry of the helical spring for at least one spring geometry parameter, analyzing the discrepancy data and producing correction data when discrepancies are outside selected predetermined tolerance limits, varying an actuating movement of at least a portion of the forming device on the basis of the correction data for producing a next helical spring, selecting a spring section, determining a correction value for an actuating movement of a portion of the forming device, which correction value influences a spring geometry parameter in the selected spring section, and correcting the NC control program based on the correction value.

21 Claims, 5 Drawing Sheets

(56) References Cited

U.S. PATENT DOCUMENTS

| | | | |
|---|---|---|---|
| 6,836,964 B2* | 1/2005 | Hasegawa et al. | 29/896.9 |
| 8,166,786 B2* | 5/2012 | Speck | 72/137 |
| 2003/0158620 A1* | 8/2003 | Hasegawa et al. | 700/165 |
| 2008/0302156 A1* | 12/2008 | Itaya | 72/135 |
| 2009/0007619 A1* | 1/2009 | Speck | 72/137 |
| 2011/0214467 A1* | 9/2011 | Krueger et al. | 72/19.7 |

FOREIGN PATENT DOCUMENTS

| | | | |
|---|---|---|---|
| DE | 103 45 445 A1 | 9/2004 | |
| JP | 02192839 | * 7/1990 | B21F 3/06 |
| JP | 02192839 A | * 7/1990 | B21F 3/06 |
| JP | 5-261462 | 10/1993 | |
| JP | 2001-526117 | 12/2001 | |
| JP | 2001-526117 A | 12/2001 | |
| JP | 2003-136171 | 5/2003 | |
| JP | 2004-306075 | 11/2004 | |
| JP | 2004-314082 | 11/2004 | |
| JP | 2004-314082 A | 11/2004 | |

OTHER PUBLICATIONS

Japanese Office Action issued Dec. 2, 2014 for corresponding Japanese Patent Application No. 2011-031741.

* cited by examiner

METHOD AND APPARATUS FOR PRODUCTION OF HELICAL SPRINGS BY SPRING WINDING

RELATED APPLICATION

This application claims priority of German Patent Application No. 10 2010 010 895.2, filed on Mar. 3, 2010, the subject matter of which is incorporated herein by reference.

TECHNICAL FIELD

This disclosure relates to methods for production of helical springs by spring winding with a numerically controlled spring winding machine, and to spring winding machines suitable for carrying out the method

BACKGROUND

Helical springs are machine elements required in large quantities and different configurations in numerous fields of application. Helical springs, also referred to as wound torsion springs or coil springs, are normally produced with cylindrical, conical or barrel shapes from spring wire and are in the form of tension springs or compression springs depending on their load during use. Compression springs, in particular bearing springs, are required, for example, in large quantities for automobile construction. The spring characteristic can be influenced, inter alia, by sections of different pitch or with different pitch profiles and/or different spring diameters.

Nowadays, helical springs are normally produced by spring winding with the aid of numerically controlled spring winding machines. In this case, a wire (spring wire) is fed to a forming device of the spring winding machine, controlled by an NC control program, and is formed with the aid of tools of the forming device into a helical spring. The tools generally include one or more winding pins, whose position is adjustable, for defining and varying the diameter of spring turns, and one or more pitch tools which determine the local pitch of the spring turns in each phase of the manufacturing process.

Spring winding machines are on the one hand intended for producing many springs with a specific spring geometry within very tight tolerances, at a high production rate. On the other hand, an increasingly wide range of helical springs demands greater flexibility and short conversion times of the production facilities to ensure timely delivery with a high yield capability at the same time.

In respect of stringent quality requirements, for example, in the motor vehicle field, it is normal practice to check certain spring geometry data such as the diameter, length and/or pitch and/or pitch profile of the spring by suitable test equipment during manufacture and, in the event of discrepancies from the nominal geometry outside the tolerance limits, to vary manufacturing parameters such that the spring geometry remains within the tolerances. In spring winding machines with NC control manufacturing parameters can be varied by correcting the NC control program.

Hence, it could be helpful to provide methods which allow that a correction to an NC control program for a spring winding machine can be carried out quickly and objectively and, therefore, more efficiently than in the past when setting up a new manufacturing process or when improving a manufacturing process which has been set up. It could also be helpful to provide spring winding machines suitable for this purpose.

SUMMARY

We provide a method of producing helical springs by spring winding with a numerically controlled spring winding machine including feeding a wire, controlled by an NC control program, through a feed device to a forming device of the spring winding machine, forming a helical spring from the wire with the forming device, measuring an actual geometry of the helical spring to obtain actual spring data, comparing the actual spring data with nominal spring date to determine discrepancy data which represents a discrepancy between an actual geometry and a predetermined nominal geometry of the helical spring for at least one spring geometry parameter, analyzing the discrepancy data and producing correction data when discrepancies are outside selected predetermined tolerance limits, varying actuating movement of at least a portion of the forming device on the basis of the correction data for producing a next helical spring, selecting a spring section, determining a correction value for an actuating movement of a portion of the forming device, which correction value influences a spring geometry parameter in the selected spring section, and correcting the NC control program based on the correction value.

We also provide a spring winding machine that produces helical springs by spring winding controlled by an NC control program including a feed device that feeds wire to a forming device, wherein the forming device has at least one winding tool which essentially governs a diameter of the helical spring at a predeterminable position as well as at least one pitch tool whose action on a helical spring being developed governs local pitch of the helical spring, and wherein the spring winding machine is configured to carry out the method.

We further provide a computer program product stored on a computer-readable medium or in the form of a signal, wherein the computer program product results in the computer carrying out the method when the computer program product is loaded in the memory of a computer and is run by a computer of a spring winding machine.

DETAILED DESCRIPTION

It will be appreciated that the following description is intended to refer to specific examples of structure selected for illustration in the drawings and is not intended to define or limit the disclosure, other than in the appended claims.

Our methods for production of helical springs by spring winding with a numerically controlled spring winding machine comprise:

feeding a wire, controlled by an NC control program, through a feed device to a forming device of the spring winding machine;

forming a helical spring from the wire with the forming device;

measuring an actual geometry of the helical spring to obtain actual spring data;

comparing the actual spring data with nominal spring data to determine discrepancy data which represents a discrepancy between the actual geometry and a predetermined nominal geometry of the helical spring for at least one spring geometry parameter;

analyzing the discrepancy data and producing correction data when discrepancies are outside selected predetermined tolerance limits;

varying actuating movement of at least a portion of the forming device on the basis of the correction data for producing a next helical spring;

selecting a spring section;

determining a correction value for an actuating movement of a portion of the forming device, which correction value influences a spring geometry parameter in the selected spring section; and correcting the NC control program based on the correction value.

In the method, a spring section is selected and/or defined for which a correction is intended to be carried out. A correction value for an actuating movement of at least one tool is then calculated, which correction value influences the spring geometry parameter under consideration in the selected spring section. Finally, the NC control program is corrected taking account of the correction value. One or more springs can then be manufactured using the amended NC program.

The method allows the determination and interpretation of discrepancy data to concentrate on at least one specific spring section which, for example, is particularly difficult to produce with narrow tolerances for the spring type that is being produced and/or which is particularly critical for the function of the helical spring. The length of the spring section is in general only a fraction of the overall length of the spring, for example, about 50% or less or about 30% or less, or about 10% or less of the overall length, as a result of which the amount of data to be taken into account for the assessment process may be relatively small. If required, the spring section can be very short and, for example, may correspond to a length which is less than ¼ of a turn or less than $\frac{1}{10}^{th}$ of a turn of the spring. By way of example, a lower limit may be 1/360 of a turn, which corresponds to an angular resolution of 1° for measurement and correction.

If the first correction step does not yet represent the desired degree of success, the correction can be repeated. In general, at most one or two repetitions is or are required. However, a single correction is normally sufficient to bring the geometry of the selected spring section close to the nominal geometry.

It may be sufficient to carry out the correction on only a single spring section of the helical spring. However, it is also possible to repeat the process for one or more other spring sections. In particular, the process can be carried out as a function of the complexity of the spring geometry, for example, for two, three, four or more spring sections. A small number of spring sections, for example, a maximum of five or six, is generally sufficient.

In one example of the method, the helical spring is subdivided into a plurality of spring sections, which are generally adjacent to one another and have a different pitch change, and one spring section is selected, and the correction value is determined for the selected spring section. A spring section with a substantially constant pitch change is preferably selected. The selection criterion for the pitch change for identification and selection of a spring section has been found to be highly advantageous, for example, during the production of compression springs since, in theory, helical springs can often be broken down into sections with different sub-functions, and these sections are often distinguished by a different pitch or different pitch profiles. By way of example, a spring section may be distinguished by a substantially constant pitch change.

The pitch profile along a helical spring must generally be complied with very exactly. Frequently, the spring sections used to transfer the spring force of a compression spring to the connecting body at the start and at the end of the spring, that is to say the spring start section and the spring end section, must be designed such that inward springing can take place as axially as possible in every spring position. In general, this can be achieved by reducing the pitch toward the corresponding spring ends. Inter alia, for this reason, some examples provide for at least one correction to be carried out in a spring start section adjacent to the spring start and/or in a spring end section adjacent to the spring end. On the one hand, these spring sections are generally difficult to manufacture and on the other hand they are often critical for the desired function of the helical spring, as a result of which, on the one hand, a correction is frequently required and, on the other hand, is very effective for improving the spring characteristics.

Some helical springs also have one or more constant sections, that is to say, sections with constant pitch or have a substantially negligible pitch change, that is to say, where the pitch change is equal to zero or fluctuates only slightly around the value zero. Such constant sections can occupy relatively large length areas of a helical spring as a result of which minor corrections in the pitch can be used well for a correction which may be required to the overall length of the helical spring.

A plurality of spring sections may be corrected in one correction process. In software terms, the process steps for the different spring sections are normally carried out sequentially and, overall, this then results in a plurality of correction values with a plurality of evaluated spring sections which are then jointly implemented in the correction of the NC program.

Frequently, it is particularly useful to first correct the pitch and/or the pitch profile in a spring start section and/or in a spring end section and then, if required, to correct the pitch in a constant section if the pitch in the constant section and/or the overall length of the helical spring are/is outside the tolerance. In this case, the target parameter in the end sections is normally an optimum pitch profile, while the spring length, which is dependent on the pitch, can be considered to be the target parameter which is to be set specifically for correction in the constant section.

A pitch measure which corresponds to the local pitch of the helical spring is preferably determined during the measurement. For example, a gap size between successive turns can be defined for a multiplicity of angular positions of the helical spring during the measurement to derive a pitch measure. The gap size is the unobstructed separation, measured parallel to the axis, between adjacent windings. It is also possible to determine the winding interval, that is to say, the axial distance between adjacent windings at the wire center in each case, or to determine the pitch directly on the basis of the profile of the wire.

If the spring geometry parameter represents the pitch of the helical spring, at least one tool which influences the pitch of the helical spring is set on the basis of the correction value. The correction value can accordingly represent a variation in the position and/or the axial movement of the pitch tool in a predetermined turn section in the area of a correction location. A pitch tool for forming is preferably influenced on the basis of the correction value. If the forming device has one or more winding fingers which can be adjusted under numerical control and their adjustment (for example, tilting and/or rotation) affects the pitch, these can also alternatively or additionally be corrected in their process movement.

The correction value can be calculated or determined in various ways. Preferably, determination of the correction value comprises determination of a maximum discrepancy between the actual spring data and the nominal spring data, and of a location of maximum discrepancy associated with the maximum discrepancy in the selected spring section, and a correction value is determined for an actuating movement of a tool, which correction value influences the spring geometry parameter at the location of maximum discrepancy.

The process of determining the maximum discrepancy can be implemented as an assessment criterion in software with algorithms which operate reliably. If the location of maximum discrepancy associated with the maximum discrepancy is identified as the correction location in the spring section and, if in consequence, the correction of the manufacturing process is carried out such that it acts substantially on the location of maximum discrepancy, then the adjacent areas where there is a small discrepancy are in general also automatically corrected by the correct amount and in the correct direction (specifically reducing the discrepancy) as a result of which the correction in the entire spring section results in a considerable reduction in the discrepancies. If only the correction value associated with the maximum discrepancy is processed to correct the control program, program changes can be implemented with minimal effort.

This evaluation method is particularly worthwhile in combination with the selection of one or more spring sections whose lengths make up only a fraction of the overall spring length. In exceptional cases, for example, in the case of a very simple spring geometry, the spring section can also occupy the overall length of the spring.

For example, as an alternative, it is possible to form a mean value (unweighted or weighted) of all the measured discrepancies in the selected spring section and to use this to derive a correction value which is applied during the correction process to a plurality of correction locations or to an extended area.

The helical spring is preferably measured on a measurement device which is separate from the spring winding machine.

The NC control program can be corrected, taking account of the correction value, in various ways. For example, the correction value can be determined and displayed at the measurement device, and an operator can read the correction value and enter it on an operator interface of the spring winding machine. For this purpose, the measurement device can be programmed such that the evaluation method can be carried out on the measurement device.

Preferably, data is transferred automatically or in a manner which can be automated between the measurement device and the spring winding machine, for example, via a network link or by data storage medium. For this purpose, it is possible for the measurement data generated by the measurement device to be transmitted via a programmed interface associated with the control software for the spring winding machine. This allows commercially available standard measurement devices to be used, with characteristics selected for the measurement task, and possibly with proprietary data formats. The data coming from the measurement device can be changed to a format which can be processed for the control software of the spring winding machine, and can be processed further, with the aid of the interface.

In particular, the definition of the at least one spring section, the calculating of the correction value and the correction of the NC program can be carried out exclusively with the aid of the control software of the spring winding machine. This may also apply to determination of a maximum discrepancy and of the associated location in the spring section in a preferred manner for determining a correction value. Suitable evaluation algorithms and, if required, conversion program modules are provided for this purpose in this software.

Preferably, control software for the spring winding machine controls a preferably graphic operator interface to enter geometric data which corresponds to the nominal geometry, and an NC generator is provided to convert the entered geometric data to a sequence of NC sets for the NC control program. There is therefore no longer any need for an operator to access the individual NC set level to modify the control program. The correction value is preferably converted to an input format for the NC generator such that modifications to the NC control program can be carried out automatically with the aid of the NC generator. The correction therefore need not be carried out at the NC level, but carried out closer to the operator, possibly with a display of the correction in a display format with which the operator is familiar.

In general, the data formats and data representations of the measurement device and spring winding machine are not directly compatible. For example, it is possible for first data sets for a set of first support points to be produced during the measurement for the actual spring data, and for the nominal spring data to be produced in the form of second data sets for a set of second support points. In both cases, the "support points" in each case represent specific selected locations along the turns of the spring, but in general in different configurations and/or with a different subdivision. The values associated with the support points for spring geometry parameters, for example, the pitch, may also be configured differently. A correction data set for a second support point is then produced for the correction, corresponding to a location which is suitable for the correction action, in particular the location of the maximum discrepancy in a spring section.

If a data set with a second support point which is not too far away, by random chance, is already available for this location, in particular for the location of the maximum discrepancy, this data set is corrected with the aid of the correction value, for example, by correcting a pitch value in the data set such that the pitch tool assumes a different position after the correction for the production of the next helical spring, or carries out a different work movement than before the correction.

However, it is possible before the correction for the second data sets not to contain a second data set whose second support point corresponds to a location which is in a predefined near area around the calculated correction location, in particular the location of the maximum discrepancy, or which corresponds precisely to this location. In this situation, a new data set is preferably generated for a second support point which corresponds to the calculated correction location, for example, the location of the maximum discrepancy. The other second data sets may if necessary be converted and adapted. This allows the calculated correction value to be taken into account optimally at the correct position in the calculation of the corrected NC control program.

We also provide a numerically controlled spring winding machine specially adapted to carry out the method. This has a feed device for feeding wire to a forming device, as well as a forming device with at least one winding tool which essentially governs the diameter of the helical spring at a predeterminable position, as well as at least one pitch tool whose action on the helical spring to be developed governs the local pitch of the helical spring.

The control software which is active or can be activated in a memory device of the control device for the spring winding machine has a programmed interface to transfer measured data from an external measurement device. Data formats may be adapted during the data transfer. The control software preferably has program components which can control the definition of the at least one spring section, possibly the determination of a maximum discrepancy and of the associated location in the spring section, the calculation of the correction value, and the correction of the NC control program.

In some modern CNC spring winding machines, our methods can be implemented using already existing drives and control systems. We provide the capability of implementing additional program parts or program modules in the control software of computer-aided control devices.

We further provide a computer program product stored in particular on a computer-readable medium or in the form of a signal, wherein the computer program product results in the computer carrying out our methods or preferred examples thereof when the computer program product is loaded in the memory of a suitable computer and run by a computer.

These and further features are disclosed not only in the appended claims, but also in the description and drawings, wherein individual features can in each case be implemented on their own or in groups of two or more in the form of sub-combinations, and in other fields.

Figure 1:
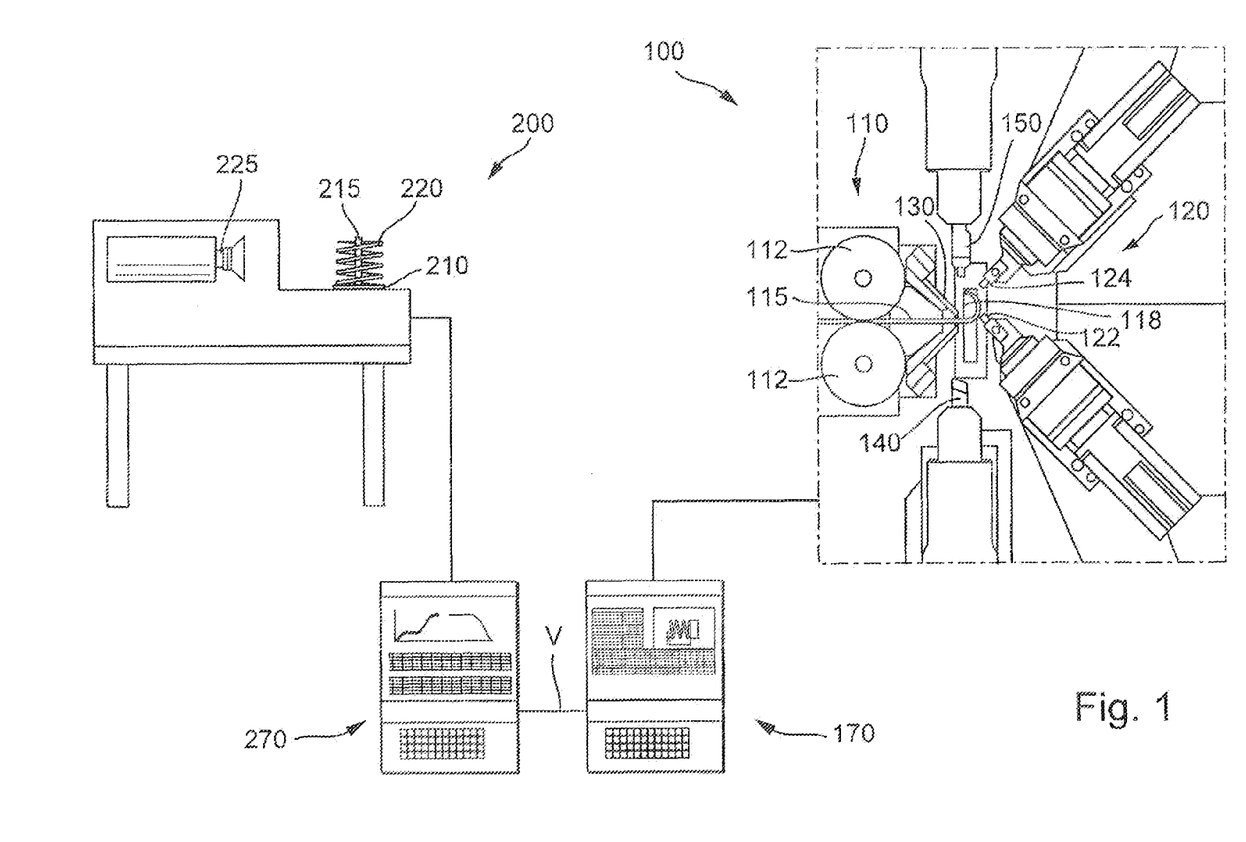
FIG. 1 shows a schematic overview illustration of one example of a spring winding machine designed to receive measurement data from a separate measurement device and to process the data to correct the NC control program.

Turning now to the drawings, the schematic overview illustration in FIG. 1 shows, on the right side, major elements of a CNC spring winding machine 100 of a design known per se, and the left-hand part of FIG. 1 shows a measurement device 200, whose design and function can likewise correspond to a conventional type of measurement device. The spring winding machine 100 has a feed device 110 equipped with feed rollers 112 and feeds successive wire sections of a wire 115, which comes from a wire supply and is passed through a directing unit, with a numerically controlled feed rate profile into the area of a forming device 120. The wire is formed with the aid of numerically controlled tools of the forming device, into a helical spring. The tools include two winding pins 122, 124, arranged offset through an angle of 90°, are aligned in the radial direction with respect to the center axis 118 (which corresponds to the position of the desired spring axis), and are intended to determine the diameter of the helical spring. The position of the winding pins can be varied along the movement lines shown by dashed-dotted lines during the setting up process for the basic setting for the spring diameter to set the machine up for different helix diameters. These movements can also be carried out with the aid of suitable electrical drives, monitored by the numerical control system.

A pitch tool 130 has a point aligned tangentially with respect to the spring axis and engages alongside the turns in the developing spring. The pitch tool can be moved with the aid of a numerically controlled movement drive for the corresponding machine axis parallel to the axis 118 of the developing spring (at right angles to the plane of the drawing). The wire which has been fed during spring production is forced off by the pitch tool corresponding to the position of the pitch tool in the direction parallel to the spring axis, with the local pitch of the spring in the corresponding section being governed by the position of the pitch tool. Pitch changes are implemented by movement of the pitch tool parallel to the axis during spring production.

The forming device has a further pitch tool 140 which can be positioned vertically from underneath and has a wedge-shaped tool point which is inserted between adjacent turns during use of this pitch tool. The adjustment movements of this pitch tool take place at right angles to the axis 118. This pitch tool is not used in the illustrated production method.

A numerically controllable separating tool 150 is fitted above the spring axis and, after completion of the forming operations for production, cuts the helical spring which has been produced from the wire supply that has been fed by a vertical work movement. FIG. 1 shows the wire that has been fed in a situation immediately after the previously completed helical spring has been cut off. In this position, the wire has already formed half a turn, and the wire end which forms the spring start is located 0.3 turns before the position of the pitch tool 130.

The machine axes of the CNC machine associated with the tools are controlled by a computer-numerical control device, which is not illustrated and has memory devices in which the control software resides, including, inter alia, an NC control program for the work movements of the machine axes.

To manufacture a helical spring, the wire is fed forward, starting from the "spring ready position" illustrated, with the aid of the feed device 110 in the direction of the winding pins 122, 124, and is bent by the winding pins to the desired diameter, forming a curve in the form of a circular arc, until the free wire end reaches the pitch tool 130. When the wire is fed further, the axial position of the pitch tool governs the current local pitch of the developing helical spring. During the process, the pitch tool is moved axially, monitored by the NC control program, when the pitch is intended to be varied during spring development. The actuating movements of the pitch tool essentially define the pitch profile along the helical spring.

When setting up the spring winding machine, the forming tools are moved to their respective basic positions. In addition, the NC control program is created or loaded and controls the actuating movements of the tools during the manufacturing process. The geometry for the spring winding machine is entered by an operator on the display and control unit 170. For this purpose, the control software for the spring winding machine produces the graphic operator interface, which is illustrated schematically in FIG. 2 and is used to enter geometric data defining the nominal geometry of the spring to be produced. The data is entered for a cylindrical compression spring, which is illustrated schematically at the top on the right and is intended to have a nominal diameter De of 28.7 mm, a number of turns nt=6 turns and an overall length Lo of 60 mm, with the diameter d of the wire being 3.9 mm. These values also appear in the upper table on the left. If the data has already previously been entered and stored, the data can be called up from an electronic memory by stating a spring identification.

Figure 2:
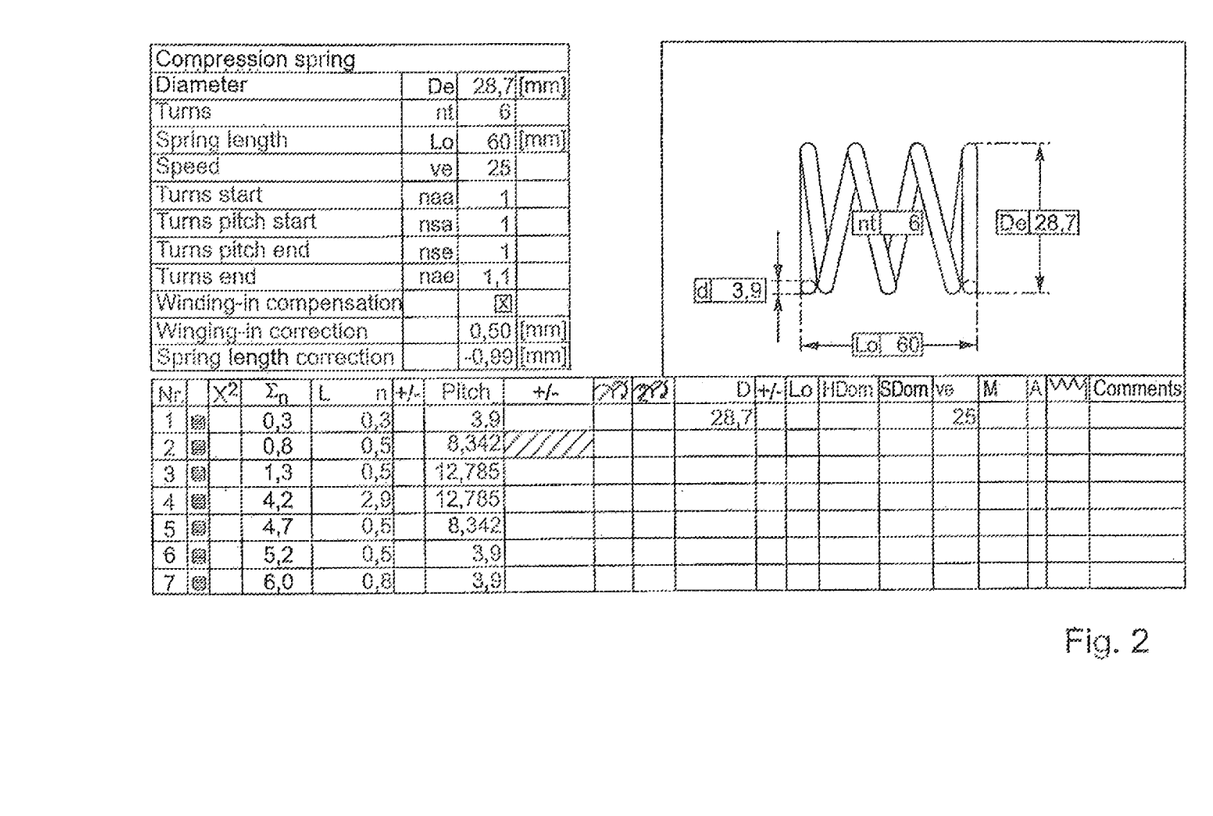
FIG. 2 shows a schematic illustration of a screen display on a display and control unit for the spring winding machine, wherein, in the illustrated mode, geometric data for a spring that is to be manufactured can be entered.

The lower table represents, inter alia, the pitch profile of the nominal geometry in the form of seven second data sets, which have the numbers 1 to 7 in the first column of the table. The position co-ordinates for the respective location associated with these data sets along the turn are indicated with the designation $\Sigma_n$ in the fourth column, with the parameter n indicated in the fifth column corresponding to the number of turns. A number of turns n=0.3 in the first row corresponds, for example, to a position co-ordinate of 0.3 turns starting from the spring-ready position shown in FIG. 1, in which half a turn has already been produced. In the example, this position (0.3 turns) is reached when the wire has been fed forwards sufficiently that the spring start just reaches the pitch tool 130. The seventh column with the column heading Pitch indicates a measure of the pitch at this location. By way of example, the pitch is shown here with the dimension [mm/n], that is to say with the dimension mm/turn. A pitch of 3.9 accordingly corresponds to a situation in which, with a wire diameter of 3.9 mm, the subsequent turn just touches the previous turn such that there is a gap size of zero between the turns, and the interval between the wire centers corresponds to the diameter of the wire.

The fifth column with the column heading n in each case shows the number of turns between the support points of the previous data set and the current data set, that is to say an increment in the number of turns or a distance between successive support points with this configuration. The seventh column "Pitch", which indicates the local pitch at the respective support point, shows that the compression spring has a pitch profile symmetrical with respect to the spring center, with the pitch first increasing from the spring start to the center, remaining constant in a central area between the support points associated with rows 3 and 4, and then decreasing again toward the spring end.

The eighth column, which follows the pitch column, with the column header "+/−" is the correction column. The pitch values in the column before this can be changed by entries of a correction value in this column, with the pitch being increased or decreased, depending on the mathematical sign of the value entered. This allows the pitch profile to be varied along the spring.

In conventional spring winding machines of this type, it has been possible for an operator to carry out these corrections by entering correction values in the column "+/−" manually when a measurement has shown that the pitch profile of the compression spring is outside the tolerance. A very high skill level is required to do this to arrive at the desired spring geometry correction in as few attempts as possible. The location and extent of the correction are determined by trial and error, and a number of attempts with repeated measurements may have been necessary.

One important aspect of our methods is that this operator-dependent procedure can be avoided, and the success of the spring correction can be ensured reproducibly, irrespective of the skill and the knowledge of the operator.

The measurement device 200 is designed to measure the so-called "gap size" of helical springs contactlessly with the aid of a camera. A rotating plate 210 with a defined, flat contact surface is fitted in a test cell and a pin 215 with internal illumination is attached thereto. A helical spring 220 to be measured is placed over the pin for measurement and is placed on the contact surface. In addition, a line-scanning camera 225 is arranged such that it is aligned exactly on the center axis of the spring. The helical spring is rotated continuously at a constant rate with the aid of the rotating plate to record measured values. During the process, individual images in the form of image lines are recorded at regular time intervals or angular intervals. An evaluation program forms an overall image from the recorded image lines, and evaluates this. The determined measured values are stored, and can be evaluated at a later time. Measurement devices of this type are known per se. One particularly highly suitable measurement device is marketed by the company imess GmbH, Witten (Germany) under the name "imess F 465."

The measurement device is used to record actual spring data, describing the geometry of a helical spring 220 which has been produced and measured. First data sets for a set of first support points are generated for the actual spring data. In the example, an individual image is in each case recorded after rotation of the spring through 30°, and values for the gap size which can be seen in this view can be determined therefrom. A display (measurement screen) is produced on a display and control unit 270 of the measurement device, allowing the operator to see the measurement results in processed form.

Figure 3:
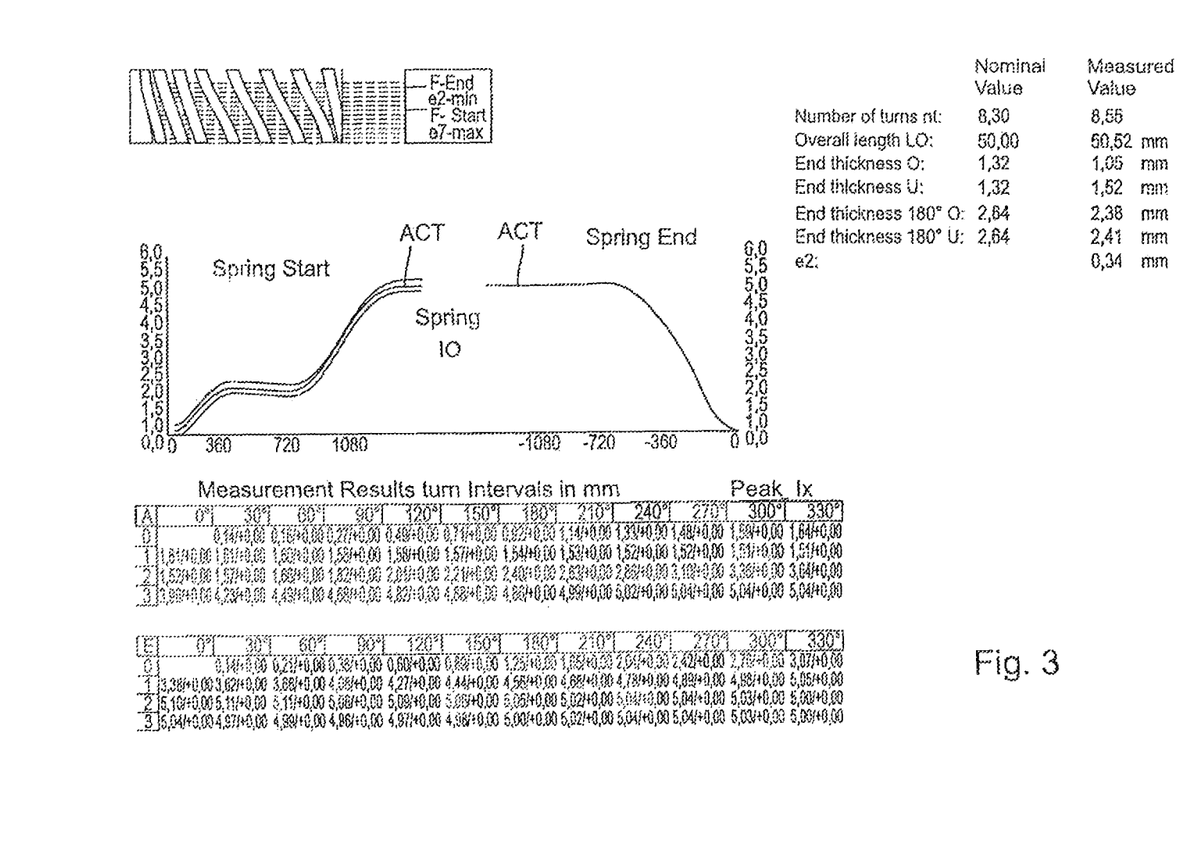
FIG. 3 shows a schematic illustration of a screen display on a display and control unit of the measurement device, during the measurement of a helical spring.

By way of example, FIG. 3 shows the display of a measurement screen during the measurement of a helical spring. The current camera image is shown at the top on the left from which, in the example, it can be seen that the gap size or the pitch of the compression spring varies in a plurality of steps over the length of the spring. The measurement results are displayed to the operator under this real-time display in the form of a graph and in tabular form below. Data sets for the nominal geometry (nominal values and tolerances) are stored in a measurement device memory as a result of which the measurement device can provide the operator directly with information about the quality of the spring. The numerical values for the measurement (measured value) as well as the appropriate nominal values of the nominal geometry can be read by the operator from the table shown at the top on the right. The measured actual values are shown in the graph display by a thick solid line ACT, and the tolerances are represented by the thinner lines above and below the actual values. The measurements which do not comply with the tolerances are marked in color in this display.

The four next turns are indicated as lines in each case for the spring start section (symbol A) and the spring end section (symbol E) from the lower table, with the heading "measurement result, turn intervals in mm." The table shows the values for the respective gap size for the equidistant angular steps indicated in the header line. The upper four lines represent the values for a spring start section with four turns, while the lower part of the table illustrates those of a spring end section, likewise with four turns. In the example there is a constant section, that is to say a spring section with a constant pitch, between the spring start section and the spring end section. The test equipment has found that the actual values are within the tolerances in this area. The constant part is therefore not shown on the graph, but is represented by the expression "spring IO."

As can be seen, the pitch increases approximately linearly in the area of the first turn (up to 360°) at the spring start, followed by a subsection with a constant pitch up to a rotation angle of about 800° (pitch change=0), before being followed by a further section with a largely linearly increasing pitch, before the pitch size, for the constant section (with a gap size of about 4.9) is reached. In the area of the spring end section, the pitch or the gap size decreases over about the last 1.5 turns, in accordance with a non-linear change function.

Figure 4:
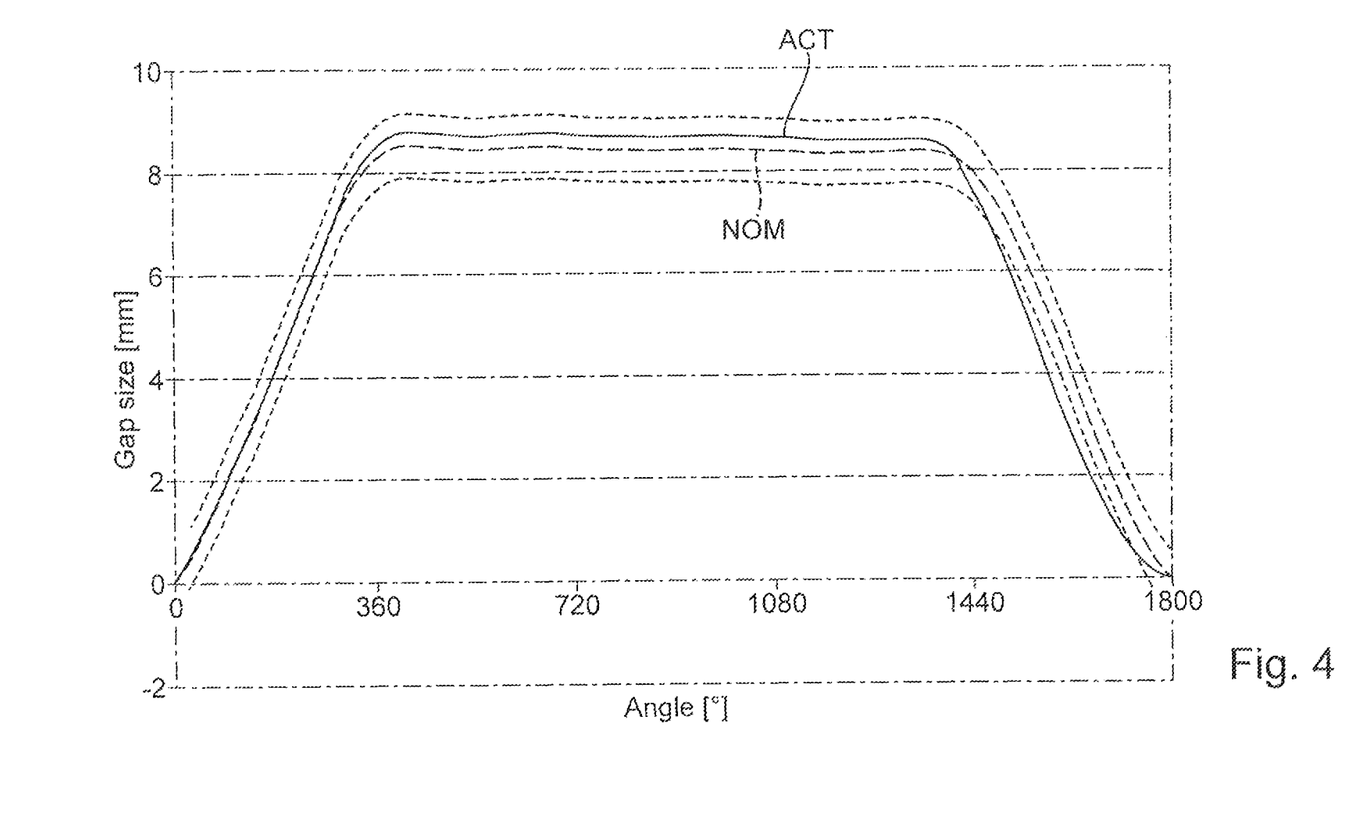
FIG. 4 shows a schematic diagram of a measured-value output from the measurement device.

One preferred example for carrying out a spring correction will be described in the following text with reference to a less complex spring geometry. In this context, FIG. 4 shows an illustration of the results of a measurement of the gap size plotted against the rotation angle on a cylindrical compression spring with six turns. Gap sizes other than zero result with the measured spring only after in each case 0.5 turns, measured from the spring start and from the spring end. The simplified diagram shows only that area of the measurement results in which the gap size is not zero. This area accordingly corresponds to an area of five turns (corresponding to 1800° rotation during the measurement). The solid line identified by "ACT" represents the actual spring data, that is to say the measured values for the helical spring to be assessed. The bold dashed line annotated "NOM" represents the nominal data, that is to say the desired geometry of the spring. The thin dashed lines above and below the line for the nominal data correspond to the upper and lower tolerance values.

As can be seen, the actual values in the area of increasing gap size of the first turn in the spring start section are very close to the nominal values, and are very well within the tolerance. In the constant area between 360° and 1400°, the tolerances are likewise not exceeded, although the measured gap size (actual value) is systematically slightly above the desired gap size. In the area of the final turn between 1400° and 1800°, there are greater discrepancies between the actual data and the nominal data, with the gap size being below the permissible tolerance after about 1500°. This situation indicates that it is predicted that all the subsequently manufactured helical springs with the current settings of the forming tools of the spring winding machine will have to be segregated as unsatisfactory parts unless the process is corrected. As can be seen, the correction must in particular increase the gap size and, therefore, the pitch in the area of the final turn although the illustration in the form of a graph does not show the extent and manner in which the nominal discrepancy can best and most easily be corrected.

Figure 5:
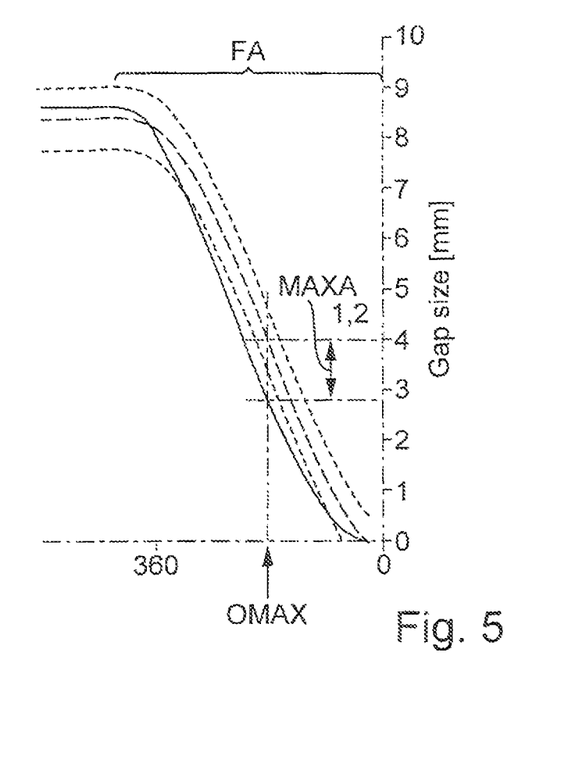
FIG. 5 shows a schematic diagram to explain the determination of a correction value in a spring end section of a helical spring.

A method which is very effective for this purpose will be explained with reference to FIG. 5 which shows a modified illustration of the last area of the illustration shown in FIG. 4. In this case, the spring end has the angular value 0°, and the angle dimension increases away from the spring end toward the spring center.

First, a spring section is selected for the evaluation process. The selection can be made by an operator. It is also possible for the operator to start an automatic selection process controlled by the software of the spring winding machine in which the measurement result is analyzed by suitable algorithms, for example, to determine the limits for the spring section on the basis of the pitch changes.

In the example, that spring section FA (spring end section) adjacent to the spring end is selected in which the gap size decreases to a major extent and largely linearly, that is to say with a constant pitch change. The start of the defined spring section FA is defined by the area of a major change in the pitch from constant pitch (pitch change zero) to greatly decreasing pitch (pitch change negative). The selected spring section in this case essentially consists of a single turn.

In the selected area, the evaluation software carries out a comparison step to determine the location within the spring section where the maximum discrepancy occurs between the actual spring data and the nominal spring data, and the extent of the maximum discrepancy at the location of maximum discrepancy. In the example, the location of maximum discrepancy OMAX corresponds to an angular position of about 180° with respect to the point where the turn makes contact with the next turn (gap size=0). The maximum value MAXA of the discrepancy achieved at this point occurs at a gap size of about 1.2 mm. The direction of the discrepancy can be configured by the mathematical sign of this value. A correction value for the actuating movement of the pitch tool is calculated on the basis of the discrepancy determined in this way, and influences the pitch at this location, in the sense of increasing the pitch (reducing the discrepancy). This correction value is then used to correct the NC control program, which is recalculated taking account of the correction value, as a result of which the discrepancy in the selected spring section is corrected as far as possible.

The evaluation principle explained here may be implemented exclusively by software components, which are components of the control software for the spring winding machine. For this purpose, the measurement data is first transmitted from the measurement device 200 to the control system for the spring winding machine 100. In the example, this is achieved by a network link V between the display and evaluation units 270 and 170 of the measurement device and spring winding machine. In this case, the actual spring data is provided by the measurement device in the form of first data sets for a set of first support points, with these support points being defined by the rotation angles of the rotating plate during the measurement and the corresponding measured values by the gap sizes associated with these angular values. By way of example, this data can form a csv file. The data in the measurement device data format is converted by an appropriately programmed interface of the control software for the spring winding machine to a data format which corresponds to the data format which is used at the user interface of the spring winding machine (cf. FIG. 2) for configuration of the location along the helical spring and the associated pitch.

The correction is then carried out by producing a correction data set for a second support point which corresponds to the location of the maximum discrepancy. If a data set exists in the configuration in the format of the first data sets (cf. FIG. 2) whose position co-ordinate either corresponds to the location of maximum discrepancy or is within a predefined near area very close to it, then the corresponding pitch value of this data set can be corrected directly by the correction value. For example, a value corresponding to the correction value could be entered in the correction column "+/−" and is then applied to the pitch in column 7, to vary the pitch parameter Pitch. However, frequently, there is no data set in the first data sets whose first support point is close enough to the location of the maximum discrepancy. In this situation, a new second data set is automatically generated for a second support point which corresponds to the location of the maximum discrepancy, and the correction value which corresponds to the maximum discrepancy is applied to this newly generated data set. This results in very precise correction by the correct correction amount at the correct location, specifically at the location of maximum discrepancy.

These processes can be carried out in a manner which is invisible to an operator. It is also possible for the result of the evaluation and its implementation to be displayed visibly to the operator on the screen display shown in FIG. 2, for example, by a correction value appearing in the column "+/−" or by a new second data set being inserted between two existing second data sets. The other data sets can be adapted by conversion.

The input data that has been amended in this way for the nominal geometry is converted with the aid of the NC generator to an amended sequence of NC sets, as a result of which processing is then carried out during the production of the subsequent helical springs in accordance with a corrected control program, in which the maximum discrepancy in the selected spring section has been corrected.

In the case of the actual spring described with reference to FIG. 4, the measurement found that the actual pitch (actual value) is systematically higher than the nominal value in the constant area between about 360° and about 1440°. This leads overall to the spring length being excessive (axial distance between the spring start and the spring end) over the relatively great length of the constant section. The measurement device has found and indicated this, and appropriate actual spring data has been transmitted to the evaluation software for the spring winding machine. The software will now also generate and display a correction value for the spring length (see the last line) in the left-hand upper table of the screen display shown in FIG. 2. In the example, the spring length must be shortened by 0.99 mm. This can be achieved by changing the position of the pitch tool for creation of the constant section to such an extent that a somewhat smaller pitch size is set in the constant section. In this case as well, the extent of the tool adjustment can be calculated accurately on the basis of the determined maximum discrepancy in this spring section.

A plurality of spring sections can be selected for the correction and can be corrected in the described manner, for example, the spring start section and the spring end section, and possibly also a constant section, and possibly also further spring sections. At the evaluation software level, evaluations can be carried out successively when a plurality of correction values (one for each spring section) can be determined in this case. These correction values can then be further jointly processed by the NC control program being amended at a plurality of points, as described, corresponding to the plurality of correction values. In the example, the pitch values for the spring end section and the constant section can be amended such that the newly produced springs no longer exceed the tolerances in the spring end section, and the overall length is likewise corrected.

The method allows automatic correction based on measured data which is recorded by an external measurement device and is available in a proprietary data format. This data is transmitted to the spring winding machine whose control software has a programmed interface added to it, in comparison to conventional spring winding machines, which converts the data coming from the measurement device to a data format which is compatible with the data formats used in the control software and for the geometry input. Furthermore, the control software has an evaluation module not provided for conventional machines, but with whose aid the described assessment and interpretation of the measurement data and the determination of correction values are carried out. The software is also able to automatically insert the correction values at an appropriate point in the geometry input and, if no such point or no such support point yet exists, to generate a corresponding data set. This results in considerable simplifications and time savings for the correction of pitch profiles and possibly for a length correction, associated with this, for helical springs, in particular for the production of cylindrical compression springs. The spring diameter can also be measured and, if necessary corrected, in a corresponding manner. The measurement and correction can also be carried out for spring types other than those specifically described here, for example, for simple conical springs.

The above description has been directed to representative examples. From the disclosure given, those skilled in the art will not only understand the disclosure and its attendant advantages, but will also find apparent various changes and modifications to the structures and methods disclosed. It is sought, therefore, to cover all changes and modifications as fall within the spirit and scope of the disclosure, as defined by the appended claims, and equivalents thereof.

What is claimed is:

1. A method of producing single coil helical springs by spring winding with a numerically controlled spring winding machine comprising:
   under direction of an NC control program, feeding a wire through a feed device to a forming device of the spring winding machine and forming a first single coil helical spring comprising a plurality of spring turns rolled about a single axis from the wire with the forming device;
   measuring an actual geometry of the first helical spring to obtain actual spring data using a separate measuring device;
   comparing the actual spring data with nominal spring data to determine discrepancy data which represents a discrepancy between an actual geometry and a predetermined nominal geometry of the first helical spring for at least one spring geometry parameter;
   analyzing the discrepancy data and producing correction data when discrepancies are outside selected predetermined tolerance limits;
   selecting a spring section from the first helical spring to which the correction data is to be applied, wherein a length of the selected spring section is a fraction of an overall length of the first helical spring;
   determining a correction value for an actuating movement of a portion of the forming device, which correction value influences a spring geometry parameter in the selected spring section;
   correcting the NC control program based on the correction value; and
   forming the next single coil helical spring using the forming device, as controlled by the corrected NC control program, by varying the actuating movement of the portion of the forming device on the basis of the correction value.

2. The method according to claim 1, further comprising:
   subdividing the first helical spring into a plurality of spring sections with a different pitch change,
   selecting one of the spring sections with a specific pitch change, and
   determining the correction value for the selected spring section.

3. The method according to claim 2, wherein the selected spring section is a constant spring section with a substantially constant pitch change.

4. The method according to claim 1, wherein at least one correction is carried out in at least one of a spring start section adjacent to a spring start and a spring end section adjacent to a spring end portion.

5. The method according to claim 1, wherein at least one correction is carried out in a constant section with a substantially constant pitch.

6. The method according to claim 1, wherein a pitch profile is initially corrected in at least one of a spring start section adjacent to a spring start and a spring end section adjacent to a spring end, and
   wherein thereafter pitch is corrected in a constant section if at least one of the pitch in the constant section and an overall length of the first helical spring are outside a selected tolerance.

7. The method according to claim 1, wherein, to determine a correction value, a maximum discrepancy is determined between the actual spring data and the nominal spring data, and a location of maximum discrepancy associated with the maximum discrepancy is determined in the spring section, and wherein a correction value is calculated for the actuated movement of a tool, which correction value influences the spring geometry parameter at a location of maximum discrepancy in the spring section.

8. The method according to claim 7, wherein the correction value associated with the maximum discrepancy is processed to correct the control program.

9. The method according to claim 8, wherein the correction value exclusively associated with the maximum discrepancy is processed to correct the control program.

10. The method according to claim 1, wherein a pitch measure corresponding to a local pitch of the first helical spring is determined during measurement, and wherein the correction value is used as the basis to adjust at least one tool which influences pitch of the next helical spring in the spring section.

11. The method according to claim 10, wherein the tool is adjusted to influence pitch in the area of the location of maximum discrepancy associated with a maximum discrepancy between the actual spring data and the nominal spring data in the spring section.

12. The method according to claim 1, wherein after the first helical spring is measured on the measurement device, data is transmitted automatically between the measurement device and the spring winding machine.

13. The method according to claim 12, wherein the data generated by the measurement device is transmitted via a programmed interface associated with a control software of the spring winding machine.

14. The method according to claim 1, wherein selecting the at least one spring section, determining the correction value and correcting the NC control program are carried out exclusively with control software of the spring winding machine.

15. The method according to claim 14, wherein determining the correction value comprises determining a maximum discrepancy and an associated location of maximum discrepancy in the spring section.

16. The method according to claim 1, wherein control software of the spring winding machine controls an operator interface for inputting geometric data which corresponds to the nominal geometry, and an NC generator converts entered geometry data to a sequence of NC sets in the NC control program.

17. The method according to claim 16, wherein the correction value is converted to an input format for the NC generator, and changes in the NC control program are carried out automatically by the NC generator.

18. The method according to claim 1, wherein, during measurement for the actual spring data first data sets are produced for a set of first support points,
nominal spring data is produced in the form of second data sets for a set of second support points, and
during correction, a second data set is produced for a second support point corresponding to a correction location.

19. The method according to claim 18, wherein the correction location corresponds to a location of a maximum discrepancy associated with a maximum discrepancy between the actual spring data and the nominal spring data in the spring section.

20. The method according to claim 19, wherein, if a second data set with a second support point is already available for a predefined near area around a correction location, the second data set is corrected with the aid of the correction value, and wherein a new second data set is automatically generated for a second support point, which corresponds to a correction location, if the second data sets, before correction, do not contain a second data set whose second support point corresponds to a location which is in a predefined near area around the correction location.

21. A method of producing single coil helical springs by spring winding with a numerically controlled spring winding machine comprising:
under direction of an NC control program, feeding a wire through a feed device to a forming device of the spring winding machine and forming a first single coil helical spring from the wire with the forming device;
separating the first single coil helical spring from the wire and measuring an actual geometry of the separated first helical spring to obtain actual spring data, wherein the separated first helical spring is measured on a measurement device which is separate from the spring winding machine;
transmitting data automatically between the measurement device and the spring winding machine;
comparing the actual spring data with nominal spring data to determine discrepancy data which represents a discrepancy between an actual geometry and a predetermined nominal geometry of the separated first helical spring for at least one spring geometry parameter;
analyzing the discrepancy data and producing correction data when discrepancies are outside selected predetermined tolerance limits;
selecting a spring section from the first helical spring to which the correction data is to be applied, wherein a length of the selected spring section is a fraction of an overall length of the first helical spring;
determining a correction value for an actuating movement of a portion of the forming device, which correction value influences a spring geometry parameter in the selected spring section;
correcting the NC control program based on the correction value; and
forming the next single coil helical spring the forming device, as controlled the corrected NC control program, by varying the actuating movement of the portion of the forming device on the basis of the correction value.

* * * * *